June 30, 1953 J. H. FLETCHER ET AL 2,643,892
TRAILER STEERING LINKAGE
Filed March 26, 1948 4 Sheets-Sheet 1
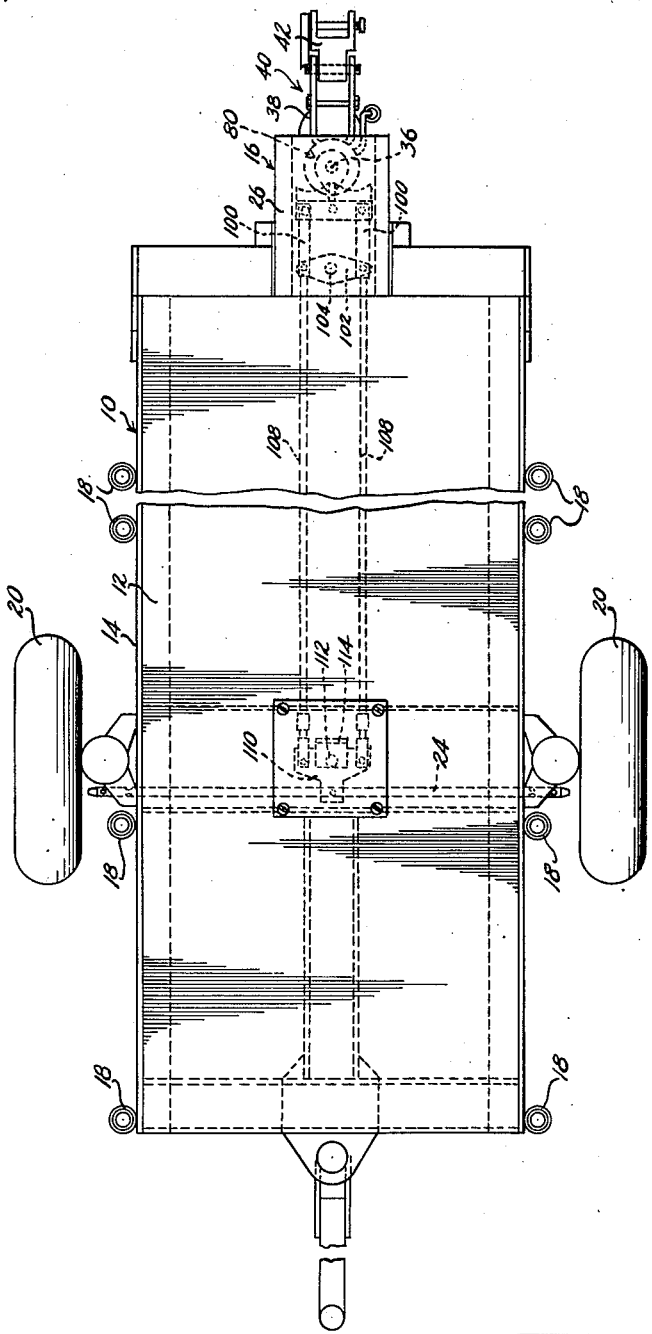
Inventors
JAMES H. FLETCHER
JAMES ROBERT FLETCHER
by
Attys.

June 30, 1953     J. H. FLETCHER ET AL     2,643,892
TRAILER STEERING LINKAGE
Filed March 26, 1948     4 Sheets-Sheet 2
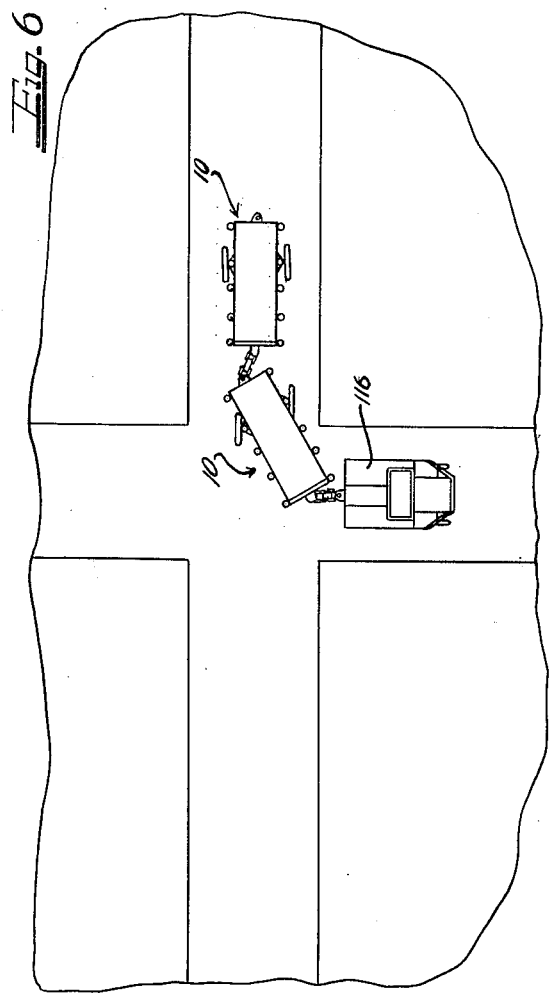
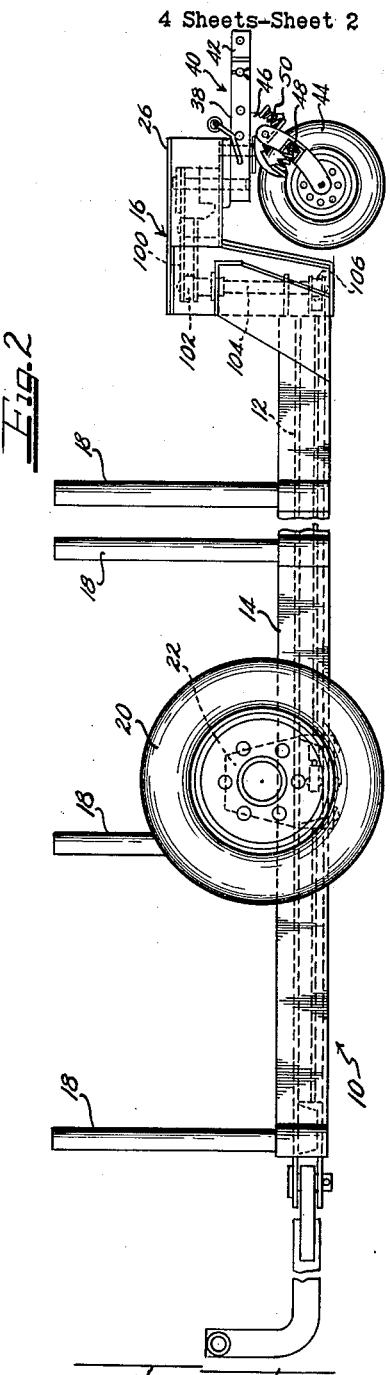
Inventors
JAMES H. FLETCHER
JAMES ROBERT FLETCHER
By The Firm of Charles M. Welsh
Attys.

June 30, 1953
J. H. FLETCHER ET AL
2,643,892
TRAILER STEERING LINKAGE
Filed March 26, 1948
4 Sheets-Sheet 3
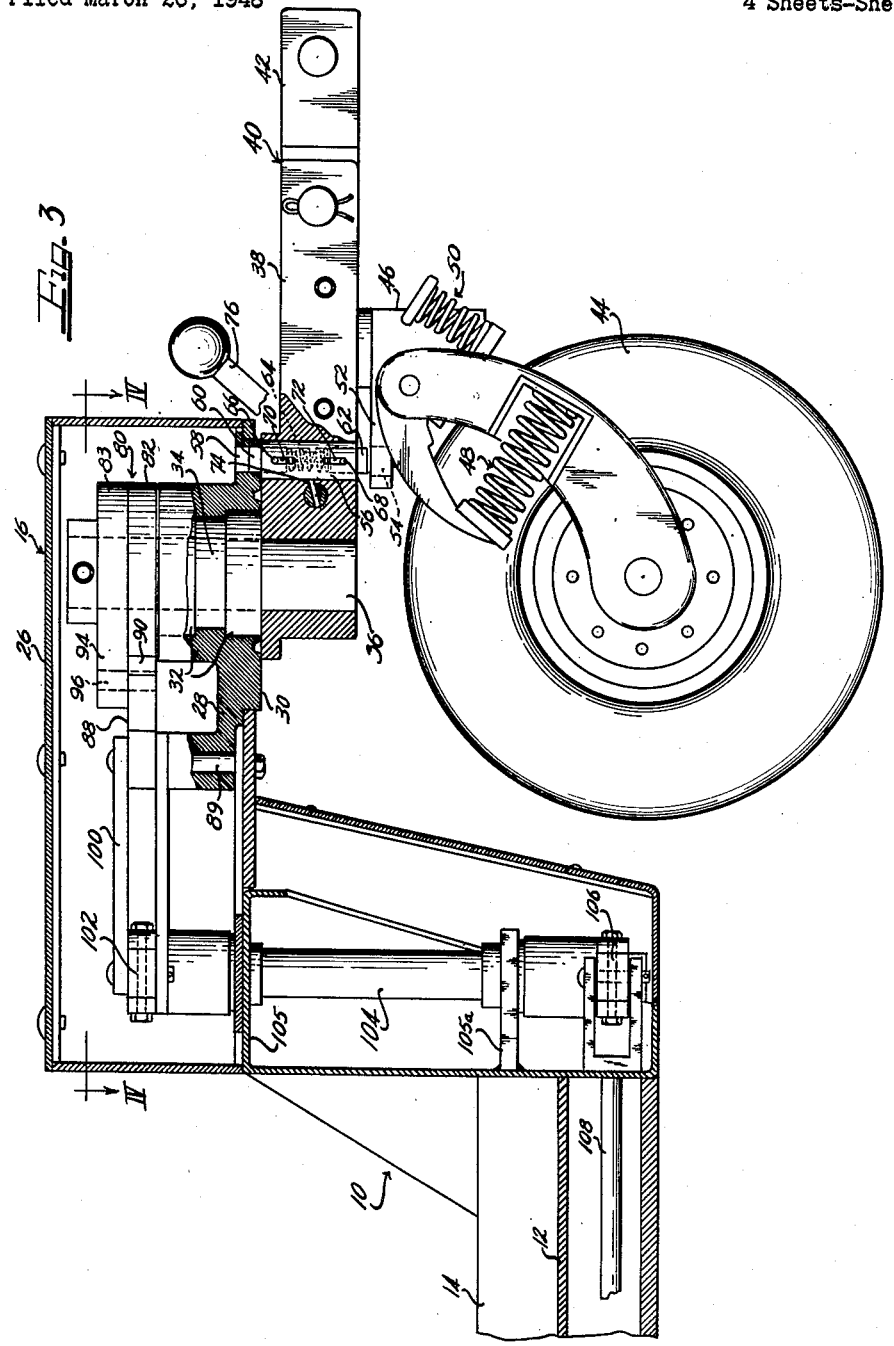
Inventors
JAMES H. FLETCHER
JAMES ROBERT FLETCHER

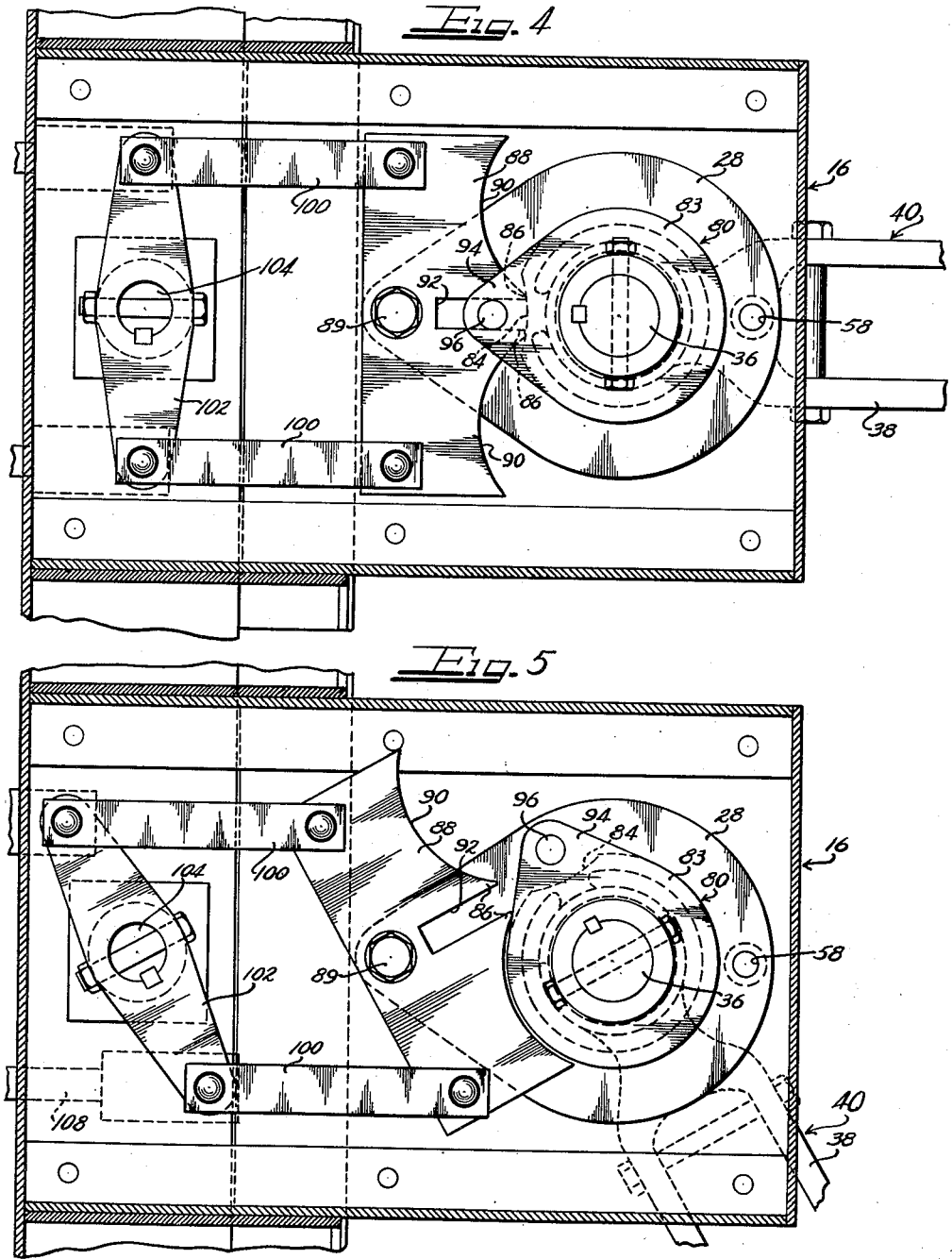

Patented June 30, 1953

2,643,892

UNITED STATES PATENT OFFICE 2,643,892

TRAILER STEERING LINKAGE

James H. Fletcher, Wilmette, Ill., and James R. Fletcher, Huntington, W. Va., assignors to J. H. Fletcher and Co., Chicago, Ill., a corporation of Illinois Application March 26, 1948, Serial No. 17,233

16 Claims. (Cl. 280—33.55)

This invention relates to a steering linkage for vehicles and particularly to an improved linkage for effecting the steering of mine trailer units.

In underground mining operations it has always been necessary that some form of vehicle be utilized in the mine passageways to transport men and materials to and from the locale of the actual mining. Formerly, tracks were laid in the passageways and cars were pulled over these tracks by mules and later by tractors to accomplish the required hauling. Now, pneumatic tired tractor-trailer units, because of their greater flexibility, low initial cost and minimum upkeep requirements, have greatly replaced the track installations.

Trailers such as are now used in underground mining operations are attached behind a tractor in single file order and it is customary and desirable to thus pull a substantial number of trailers.

However, these tractor-trailer units have been subject to certain disadvantages. The mine passageways, in order to lessen the danger of cavein, are constructed with minimum dimensions and consequently there is little vertical or horizontal clearance for the tractor-trailer units. Further these passageways have frequent right angle turns and tractor-trailer units employing conventional steering linkages have experienced great difficulty in navigating these turns. In order to conveniently navigate such a turn it has been found that the front portion of the trailer making the turn should be substantially abreast of the passage to be turned into before the rear wheels of the trailer start any deviation of heading. If this delay in deviation by the rear wheels is not accomplished, the turn is cut and the trailer may be enmeshed at the corner.

A trailer incorporating the steering linkage of this invention may successfully navigate such turns because the linkage controls steerable rear wheels of the trailer to angularly turn such wheels oppositely to the direction of the turning of the corner. With the rear wheels thus deflected, they continue to track in a substantially straight path, irrespective of the turning of the vehicle body, until they are substantially abreast of the turn. At this position, due to the pulling force of the tongue of the trailer in the new direction, the outer rear wheel pivots around the inner rear wheel and the rear wheels thus accomplish the turn in a smaller arc than would be possible by trailers having conventional steering linkage. This steering operation is particularly desirable when several trailers employing the linkage are connected in train like fashion. The last trailer of such a train will navigate the turn in substantially the same fashion and position as did the first trailer of the train. This is in distinct contrast to conventional tractor-trailer units wherein the length of the train directly increases the amount of cutting of any corner navigated.

Trailers employing conventional steering mechanisms have been subjected to the further disadvantage of becoming readily blocked when positioned in lateral proximity to a wall. Trailers embodying this invention may be readily moved away from a laterally proximate wall.

A trailer embodying this invention has a single front pivot wheel and a pair of steerable rear wheels. Mechanism is provided by which the front or pivot wheel may be selectively locked to the tongue of the trailer, or may be unlocked to pivot independently of the tongue. The same locking mechanism will selectively lock the tongue with respect to the frame of the trailer so that when the tongue is thus locked, the pivot wheel is free to pivot about a vertical axis. It is in this position of the tongue that the trailer is most easily backed. When the tongue is unlocked with respect to the frame it actuates the steering linkage in a guided turn for deflection of the tongue causes an angular deflection of the steerable rear wheels as is desired for navigating a turn.

A further feature of this invention lies in the incorporation of a connection device in the steering linkage in the form of a pivoted driving member mounted on the tongue and a pivoted driven member adjacent the driving member. A pin and slot connection between the two members provides a positive drive only through a predetermined range of angular movement of the driving member. This connection device affords positive steering control from the tongue to the rear wheels throughout a predetermined range of turning of the steerable wheels to a maximum deflection at which position the tongue is automatically disconnected from the steering linkage and the steerable wheels are secured at their maximum angle of deflection irrespective of further movement of the tongue. The tongue is automatically re-connected to the steering linkage when it is returned to a more normal position.

Accordingly, an object of this invention is to provide an improved steering mechanism for vehicles, especially for mine trailers.

Another object of this invention is to provide positive steering control for any desired number of trailers attached behind a tractor.

Another object of this invention is to provide an improved steering linkage mechanism for mine trailers so that trailers of considerable length may be utilized in restricted mine passageways and may successfully navigate sharp turns therein.

A further object of this invention is to provide a steering mechanism for trailers of simple and rugged construction and which may be economically manufactured and operated for long periods under adverse conditions.

The specific nature of this invention, as well as other objects and advantages thereof, will become apparent to those skilled in the art from the following detailed description of the annexed sheets of drawings which, by way of preferred example only, illustrate one specific embodiment of the invention.

On the drawings:

Fig. 1 is a top plan view of a mine trailer incorporating a steering linkage of this invention;

Figure 2 is a side elevational view of the trailer of Fig. 1;

Figure 3 is an enlarged view in partial section, similar to Figure 2, but showing only the forward portion of the trailer;

Figure 4 is a horizontal sectional view taken along the plane IV—IV of Figure 3;

Figure 5 is a view similar to Figure 4 but showing the linkage mechanism in a turned position; and Figure 6 is a reduced scale, schematic view of a tractor-trailer unit embodying this invention, illustrating the positions of the successive trailers as the unit is steered around a sharp turn.

Throughout the drawings, like numbers refer to the same parts in each of the several views.

As shown on the drawings:

A trailer 10 embodying this invention comprises a bed of floor 12, opposed depending side walls 14, a raised front or platform portion 16 and, if desired, a number of vertical posts 18 may be secured at spaced intervals along side walls 14 for retaining certain loads on the trailer 10. The trailer 10 is borne partially by a pair of transversely spaced steerable wheels 20 mounted in any conventional fashion on a pair of mounting brackets 22 located to the rear of the center of trailer 10. The rear wheels 20 are turned in unison in the steering operation by a conventional tie rod 24. The actuation of tie rod 24 will be described in more detail later.

The platform 16 is of hollow, box-like construction and may be readily formed by the welding of sheet metal plates for the sides and bottom, while a removable top cover 26 is bolted thereto. A bearing block 28 (Fig. 3) having a depending cylindrical portion 30 is located within the platform 16 by snugly fitting the cylindrical portion 30 within a cooperating aperture in the floor of platform 16. The bearing block 28 has a vertical aperture which serves as a housing for a spaced pair of conventional anti-friction bearing units 32. The inner races of the bearing units 32 accommodate a vertical shaft 36. A tongue 40 comprising a forward hitch 42, for attachment to a trailer or a tractor, and a fork 38 is attached at the base of the fork portion 38 to the depending end of the vertical shaft 36 to pivot therewith.

A front pivot wheel 44 is mounted adjacent and below the tongue 40 and may selectively pivot therewith or may pivot independently of tongue 40. The pivot wheel 44 is mounted to tongue 40 on a vertical pivot shaft 46 and has shock absorbing spring mounts 48 and 50. A latch receiving plate 52 is horizontally secured to the pivot shaft 46 and has an aperture 54 therein.

A locking mechanism for selective locking of the pivot wheel to the tongue comprises a latch retainer 56 of generally cylindrical cross section which is slidably inserted in a vertical aperture in the base of fork 38, said aperture being adjacent and below an aperture 58 of smaller diameter in bearing block 28. The latch retainer 56 is hollow and houses an upper latch plunger 60 and lower latch plunger 62 which are respectively urged in opposite directions by an intermediately disposed compression spring 64. The latches 60 and 62 have pins 66 and 68 respectively radially mounted therein which pins cooperate with vertical slots 70 and 72 cut in the wall of latch retainer 56 so as to retain the latches 60 and 62 in the retainer 56. The retainer 56 may be selectively manually shifted vertically by an arm 74 cooperating with a recess in the wall of retainer 56. The arm 74 is operated by a horizontal crank journalled in the base of the fork 38 and having a projecting crank arm 76. Rotation of crank 76 in a clockwise direction (Fig. 3) causes a vertically downward shift of the latch retainer 56 and hence moves latches 60 and 62 downwardly so that the lower latch 62 engages the aperture 54 of latch receiving plate 52. In this position of the latch retainer 56 the pivot wheel 44 is secured to the tongue 40 for rotation therewith. Also, in this position of the latch retainer 56, the tongue 40 is freed from the frame of trailer 10 and may pivot about shaft 36 to actuate the steering mechanism to be later described. When crank 76 is rotated in a counterclockwise direction, the upper latch 62 lodges in aperture 58 in bearing block 28, thus locking the tongue 40 to the frame of trailer 10 while lower latch 62 is removed from the latch receiving plate 52 and pivot wheel 44 pivots independently of tongue 40. In this operating condition of the tongue 40 and pivot wheel 44 the trailer 10 may be most easily backed.

As previously mentioned, the tongue 40 actuates the steering mechanism by pivotal movements about the vertical shaft 36. This actuation is accomplished through a linkage including a driving member 80 which is keyed to the top of shaft 36. The driving member 80 is of a generally disklike configuration having a lower cylindrical locking portion 82 and an upper actuating portion 83. A driven member 88 (Figs. 4 and 5) is pivoted about a vertical pivot pin 89 centrally located near the rear edge of driven member 88, such pin being vertically mounted in bearing block 28. The driven member 88 has a generally radial slot 92 in its leading edge which is flanked by a pair of arcuate cuts 90. The upper or actuating portion 83 of driving member 80 has a rearwardly projecting lip portion 94 which carries a depending pin 96 which is engaged in the slot 92 when the tongue 40 is in a normal pulling position. The lower or locking portion 82 of driving member 80 has an arcuate surface 84 cut into its outer periphery so as to afford clearance of the foremost tips 86 of driven members 88 which are respectively defined by the inner section of the side walls of the slot 92 and the arcuate cut 90. Clearance is only necessitated when the pin 96 is engaged in the slot 92 as aforedescribed.

When the tongue 40 is turned the shaft 36 rotates the driving member 80 which causes a pivotal movement of driven member 88 due to the pressure of pin 96 against the side walls of slot 92. This pivotal movement of driven member 88 occurs only throughout a predetermined range of angular movement of the driving member, and at the maximum deflection the pin 96 moves out of slot 92. At this point the arcuate cuts 90 on driven member 88 which are drawn on radii equal to the radius of the lower locking portion 82 of driving member 80, engage the cylindrical periphery of locking portion 82 of driving member 80 and driven member 88 is thereby locked against further pivotal movement (Figure 5), but the driving member is unrestrained. When the tongue 40 is returned to a more normal position, the depending pin 96 on the driving member again engages the slot 92 of the driven member and pivots the driven member 88 in the reverse direction. The engagement and disengagement of pin 96 and slot 92 occurs automatically at the same angular departure of the tongue from its neutral position. Hence, the range of angular movement of the tongue from neutral position to the position of disengagement, and the coincident range of angular movement from a normal to a maximum deflection of the steerable rear wheels, may be substantially predetermined by appropriate design of the driving member 80 and the driven member 88.

A pair of links 100 are respectively pivotally secured to the ends of driven member 88 to transmit the pivotal movements of driven member 88 to the ends of an upper rocker arm 102. The rocker arm 102 is keyed at its center to the upper end of a vertical rocker shaft 104. The rocker shaft 104 is supported by the horizontal mounting brackets 105 and 105a (Fig. 3) and the lower end of the shaft 104 extends below the trailer floor 12 where it supports a lower rocker arm 106 which is a facsimile of upper rocker 102. The ends of lower rocker arm 106 are respectively pivotally secured to a pair of connecting rods 108. The connecting rods 108 run rearwardly beneath the floor 12 parallel to the longitudinal axis of trailer 10 to the vicinity of tie rod 24. A tie rod plate 110 is provided which is of generally triangular shape (Fig. 1). The plate 110 is centrally pivotally mounted on a vertical pin 112 supported by a bracket 114 attached to the lower surface of floor 12. The connecting rods 108 are respectively pivotally secured to two corners of plate 110. The third corner of tie rod plate 110 is pivotally attached to tie rod 24 at its center. Thus pivotal movement of plate 110 will shift the tie rod 24 in a direction substantially perpendicular to the longitudinal axis of trailer 10. The shifting of tie rod 24 causes a deflection or turning of the wheel 20 in conventional manner.

From the above description it is readily apparent that a clockwise rotation of tongue 40 will produce a counterclockwise turn of the wheel 20 up to a predetermined maximum deflection where pin 96 of driving member 80 moves out of slot 92 of driven member 88. The tongue 40 may be further rotated without further increasing the angular displacement of wheels 20, but the wheels 20 remain turned at their maximum angular displacement due to the locking operation of lower locking portions 82 of driving member 80 against the arcuate slot 90 of driven member 88. When tongue 40 is returned to a more normal position the pin 96 again engages slot 92 and the wheel 20 are consequently returned to a more normal position. The maximum angular deflection of wheels 20 may be exactly predetermined by appropriate design of driving member 80 and driven member 88.

The particular advantage of having rear wheels steerable by being deflected in a direction opposite to the direction of turning is illustrated in (Figure 6). Two mine trailers 10 are shown connected in train like fashion behind a tractor 116.

As the tongue of each trailer is pivoted as the preceding vehicle enters the turn, the rear wheels of the trailer will be oppositely shifted to an equivalent degree. Hence, even though the trailer body begins to assume an angular position with respect to the original direction of movement the rear wheels of such vehicle will continue to track in a substantially straight path until they reach a position substantially abreast of the turn. Hence the pulling force imparted to the following trailer tends to swing such following trailer wide of the turn, rather than producing a cutting of the turn which would be the case with a train of conventionally steered trailers.

It is therefore apparent that the substantially straight tracking of the rear wheels of the trailer until they have reached a position substantially abreast of the turn greatly increases the navigability of the tractor-trailer train. Furthermore, each trailer will accomplish the turn in the same manner and fashion and in substantially the same position as the preceding trailer or trailers.

When the described trailer construction is designed so that the steerable rear wheels are located approximately centrally of the carrying position of load members of the maximum length for which the trailer is designed, it is insured that any corner which may be traversed by the trailer alone may also be traversed by the trailer when carrying a maximum length load in proper position thereon.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a vehicle, a body having steerable wheel means, a steering control member rotatably secured on said body, linkage means between said steering control member and said steerable wheel means, said linkage means including a rotating driving member driven by said steering control member, a driven member rotatably mounted adjacent said driving member, one of said members having a generally radial slot therein and the other of said members having a projection engageable in said slot only throughout a predetermined substantially central range of angular movement of said driving member with respect to the longitudinal axis of the vehicle whereby said steerable wheel means is angularly shifted responsive to angular movement of said steering control member throughout said predetermined range, said driving member having a concentric surface portion, said driven member having a locking surface for engagement with said concentric surface when said driving member has been turned beyond said predetermined range, whereby said steerable wheel means is held at its maximum turned position irrespective of further angular movement of said steering control member beyond said range.

2. In a vehicle, a body, a pair of steerable wheels supporting said body, a tie rod connection between said wheels, a tongue pivoted to said body, linkage means between said tongue and said tie rod connection, said linkage means including a rotating driving member driven by said tongue, a driven member rotatably mounted adjacent said driving member, one of said members having a generally radial slot therein and the other of said members having a projection engageable in said slot only throughout a predetermined substantially central range of angular movement of said driving member with respect to the longitudinal axis of the vehicle, whereby said wheels are angularly shifted responsive to angular movement of said tongue only throughout said predetermined range, said driving member having a concentric surface portion, said driven member having a locking surface for engagement with said concentric surface when said driving member has been turned beyond said predetermined range, whereby said steerable wheels are held at their maximum turned position irrespective of further angular movement of said tongue beyond said range.

3. In a vehicle, a body, a tongue pivotally secured to said body about a vertical axis, a wheel support mounted on said tongue for pivotal movement about a vertical axis, a wheel journalled on said wheel support, said body defining an aperture adjacent said tongue, a locking plate mounted on said wheel support, said plate defining an aperture adjacent said tongue, a pair of locking members shiftably mounted in said tongue and respectively engageable in said body aperture and said plate aperture, and means for concurrently shifting said locking members whereby said tongue may be locked to said body and said wheel unlocked relative to said tongue, or said tongue may be unlocked relative to said body and said wheel locked relative to said tongue.

4. In a vehicle, a body, a tongue pivotally secured to said body about a vertical axis, a wheel support mounted on said tongue for pivotal movement about a vertical axis, a wheel journalled on said wheel support, said body defining an aperture adjacent and above said tongue, a locking plate mounted on said wheel support and defining an aperture adjacent and below said tongue, a sleeve-like latch retainer vertically shiftable in said tongue, latch plungers slidable in said latch retainer, resilient means urging said plungers axially out of said retainer, means for limiting axial movements of said plungers relative to said retainer, and manual means for selectively vertically shifting said latch retainer whereby said latch plungers may selectively engage said body aperture or said locking plate aperture.

5. In a vehicle, a body, a pair of steerable rear wheels supporting said body, a tie rod connection between said wheels, a tongue pivoted to the front portion of said body, linkage means between said tongue and said tie rod connection, said linkage means including a rotatable driving member driven by said tongue, a driven member rotatably mounted adjacent said driving member, one of said members having a generally radial slot therein and the other of said members having a projection engageable in said slot only throughout a predetermined range of angular movement of said driving member, whereby said wheels are angularly shifted responsive to angular movements of said tongue only throughout said predetermined range, said driving member having a concentric cylindrical hub portion, said driven member having a non-concentric locking surface engageable with said cylindrical surface when said driving member has been turned beyond said predetermined range, whereby said steerable wheels are held at their maximum turned position irrespective of further angular movements of said tongue beyond said range, a front wheel support mounted on said tongue for pivotal movement about a vertical axis, a wheel journalled on said wheel support, and manually operable locking means journalled in said tongue for selectively locking said tongue to either said body or said front wheel support.

6. In a vehicle, a body having steerable wheel means, a steering control member pivoted to said body, linkage means between said steering control member and said steerable wheel means for turning said wheel means responsive to angular movement of said steering control member relative to said body, a wheel support mounted on said steering control member for pivotal movement about a vertical axis, a wheel journalled on said wheel support, means selectively locking said steering control member relative to said body, means selectively locking said wheel support relative to said steering control member, and a common actuator for both of said locking means whereby said steering control member may be selectively locked to said body when said wheel support is unlocked relative to said steering control member and whereby said steering control member may be selectively unlocked from said body while said wheel support is locked relative to said steering control member.

7. In a vehicle, a body, a pair of steerable rear wheels supporting said body, a tie rod connection between said steerable wheels, a draw bar tongue pivoted to said body, linkage means between said tongue and said tie rod connection to turn said wheels responsive to angular movement of said tongue relative to said body but in an opposite direction, said linkage means including a connection device rigidly connecting said tongue and said tie rod throughout a predetermined range of angular steering movement of said wheels and automatically disconnecting said tie rod upon further angular movement of said tongue beyond said predetermined range, a wheel support mounted on said tongue, a wheel journalled on said wheel support, means for selectively locking said tongue relative to said body, means for selectively locking said wheel support to said tongue, and a common actuator for both of said locking means, whereby said wheel and said wheel support are rigidly locked to said tongue when said tongue is unlocked with respect to said body so as to provide rigid support for said tongue during said turning movement, and whereby said wheel support and said wheel are unlocked with respect to said tongue while said tongue is locked relative to said trailer body so as to pivot about a vertical axis while said vehicle is being backed.

8. In a vehicle having wheels steerable in response to angular movement of a steering control member throughout a predetermined substantially central range of steering movement, the improvement which comprises steering mechanism including the steering control member, a rotatable driving member driven by said steering control member and having a projection extending therefrom, a rotatable driven member having a generally radially extending slot for receiving said projection therein throughout the predetermined substantially central range of steering movement, linking means for linking said driven member to the steerable wheels for steering the same in response to movement of the driven member, said driving member having a cylindrical portion thereon, said driven member having an arcuate locking surface at each side of said slot for engagement with the cylindrical portion on said driving member when the same has been turned beyond said predetermined central range on either side thereof, whereby the steerable wheels are held in maximum turned position irrespective of further angular movement of the steering control member beyond the predetermined steering range.

9. In a vehicle, a body having steerable wheel means, a steering control member pivoted to said body and linkage means between said steering control member and said steerable wheel means for turning said wheel means in response to an angular movement of said steering control member relative to said body, said linkage means including a connection device having intermating members rigidly connecting said steering control member and said steerable wheel means throughout a predetermined substantially central range of angular steering movement of said wheel means and automatically disconnecting said steering control member from said steerable wheel means upon further angular movement of said steering control member beyond said predetermined range, said intermating members positively reengaging said steering control member and said wheel means when said steering control member re-enters said predetermined central steering range.

10. In a vehicle, a body, a pair of steerable wheels supporting said body, a tie rod connection between said steerable wheels, a draw bar tongue pivoted to said body and linkage means between said tongue and said tie rod connection to turn said wheels in response to an angular movement of said tongue relative to said body, but in an opposite direction, said linkage means including a driving connection having aligned intermating members rigidly connecting said tongue and said tie rod through a predetermined substantially central range of angular steering movement of said wheels and automatically disconnecting said tie rod upon further angular movement of said tongue beyond said predetermined range, said aligned intermating members positively re-connecting said tongue to said tie rod connection when said tongue re-enters said predetermined central steering range.

11. In a vehicle, a body having steerable wheel means, a steering control member rotatably secured on said body, linkage means between said steering control member and said steerable wheel means, said linkage means including a rotating driving member driven by said steering control member, a driven member rotatably mounted adjacent said driving member, one of said members having a generally radial slot therein and the other of said members having a projection engaging said slot throughout a predetermined range of angular movement of said driving member to angularly shift said steerable wheel means in response to angular movement of said steering control member throughout a predetermined range, said projection and said slot being aligned to disengage upon relative rotation beyond said predetermined range and to positively re-engage when said driving and driven members re-enter said predetermined central steering range.

12. In a vehicle, a body, a pair of steerable wheels supporting said body, a tie rod connection between said wheels, a steering control member rotatably secured on said body, linkage means between said steering control member and said tie rod connection, said linkage means including a rotating driving member driven by said steering control member and a driven member rotatably mounted adjacent said driving member, one of said members having a generally radial slot therein and the other of said members having a projection engaging said slot throughout a predetermined range of angular movement of said driving member to angularly shift said wheels in response to angular movement of said steering control member, said projection and said slot being aligned with respect to one another to separate upon predetermined relative rotation of said driving and driven members and to positively re-engage when said driving and driven members re-enter the predetermined steering range.

13. In a vehicle, a body, a pair of steerable wheels supporting said body, a draw bar tongue having one end thereof pivotally mounted on said body, linkage means between said one end of said tongue and said steerable wheels for turning said wheels in response to angular movement of said tongue relative to said body, a wheel support mounted on said tongue for pivotal movement about a vertical axis, a wheel journalled on said wheel support, means for selectively locking said tongue in selected alignment relative to said body, means for selectively locking said wheel support in selected alignment relative to said tongue, and a common actuator for both of said locking means, said actuator constructed and arranged to lock said tongue relative to said body when said wheel support is unlocked and to lock said tongue relative to said wheel support when said tongue is unlocked relative to said body.

14. In a vehicle, a body, a pair of steerable wheels supporting said body, a tie rod connection between said steerable wheels, a tongue pivoted to said body, and linkage means between said tongue and said tie rod connections to turn said wheels responsive to an angular movement of said tongue relative to said body but in an opposite direction, said linkage means including a connection device having intermating members rigidly connecting said tongue and said tie rod connection throughout a predetermined substantially central range of angular steering movement of said wheels with respect to the longitudinal axis of the vehicle, and automatically disconnecting said tongue from said tie rod connection to prevent further angular movement beyond said predetermined range, said connection device further including locking means for holding said steerable wheels in a fixed angular position irrespective of further movement of said tongue beyond said predetermined range.

15. In a vehicle, a body having steerable wheel means, a steering control member rotatably mounted on said body, and linkage means between said steering control member and said steerable wheel means for turning said steerable wheel means in response to an angular movement of said steering control member relative to said body, said linkage means including a connection device having mating members rigidly connecting said steering control member and said steerable wheel means throughout a predetermined substantially central range of angular steering movement of said steering control member with respect to the longitudinal axis of the vehicle and automatically disconnecting said steering control member from said steerable wheel means upon further angular movement of said steering control member beyond said predetermined range, such connection device further including locking means holding said steerable wheel means in a fixed angular position irrespective of further movement of said steering control member beyond said predetermined range.

16. In a vehicle, a body, a dirigible wheel mechanism including a steering control actuating member pivotally mounted on said body, a draw bar connected to said steering control member for pivotal movement about the axis thereof, a pivot bracket on said draw bar, a wheel journalled on said pivot bracket, means for selectively locking said draw bar relative to said body, means for selectively locking said draw bar relative to said pivot bracket, and a common actuator for both of said locking means, whereby said draw bar may be selectively locked to said body or to said pivot bracket.

JAMES H. FLETCHER.
JAMES R. FLETCHER.

References Cited in the file of this patent

UNITED STATES PATENTS

| Number | Name | Date |
|---|---|---|
| 1,174,441 | Pennington | Mar. 7, 1916 |
| 1,304,261 | Cadman | May 20, 1919 |
| 1,364,563 | Lee | Jan. 4, 1921 |
| 1,427,513 | Byron | Aug. 29, 1922 |
| 1,428,860 | Reinschmidt | Sept. 12, 1922 |
| 1,598,675 | Coder et al. | Sept. 7, 1926 |
| 1,625,209 | Higbee | Apr. 19, 1927 |
| 1,731,730 | Starnes | Oct. 15, 1929 |
| 2,296,789 | Johnson | Sept. 22, 1942 |
| 2,335,946 | Klaus | Dec. 7, 1943 |
| 2,339,582 | Peterson | Jan. 18, 1944 |
| 2,388,308 | Court | Nov. 6, 1945 |
| 2,432,357 | Vars | Dec. 9, 1947 |
| 2,508,057 | Bishop | May 16, 1950 |

FOREIGN PATENTS

| Number | Country | Date |
|---|---|---|
| 12,430 | Australia | Sept. 18, 1928 |
| 463,510 | Great Britain | Apr. 1, 1937 |